(12) United States Patent
Sikora et al.

(10) Patent No.: US 8,003,932 B2
(45) Date of Patent: Aug. 23, 2011

(54) EVALUATING THE POSITION OF A DISTURBANCE

(75) Inventors: Edmund S R Sikora, Ipswich (GB); Peter Healey, Ipswich (GB)

(73) Assignee: British Telecommunications public limited company, London (GB)

( * ) Notice: Subject to any disclaimer, the term of this patent is extended or adjusted under 35 U.S.C. 154(b) by 259 days.

(21) Appl. No.: 11/916,054

(22) PCT Filed: Jun. 1, 2006

(86) PCT No.: PCT/GB2006/001993
§ 371 (c)(1),
(2), (4) Date: Nov. 30, 2007

(87) PCT Pub. No.: WO2006/129093
PCT Pub. Date: Dec. 7, 2006

(65) Prior Publication Data
US 2009/0014634 A1    Jan. 15, 2009

(30) Foreign Application Priority Data
Jun. 2, 2005 (EP) .................................... 05253394

(51) Int. Cl.
*G01D 5/353* (2006.01)
(52) U.S. Cl. ......... 250/227.14; 250/227.11; 250/227.19; 385/12; 385/32
(58) Field of Classification Search ............. 250/227.11, 250/227.14, 231.19; 385/12, 13, 24, 32, 385/123, 88, 89
See application file for complete search history.

(56) References Cited

U.S. PATENT DOCUMENTS

| | | | |
|---|---|---|---|
| 4,297,887 A | 11/1981 | Bucaro | |
| 4,397,551 A | 8/1983 | Bage et al. | |
| 4,443,700 A | 4/1984 | Macedo et al. | |
| 4,463,451 A | 7/1984 | Warmack et al. | |
| 4,538,103 A | 8/1985 | Cappon | |

(Continued)

FOREIGN PATENT DOCUMENTS

EP    0 251 632 A2    1/1988

(Continued)

OTHER PUBLICATIONS

International Search Report mailed Jul. 27, 2006.

(Continued)

*Primary Examiner* — Tony Ko
(74) *Attorney, Agent, or Firm* — Nixon & Vanderhye P.C.

(57) ABSTRACT

The present invention relates to a method of and apparatus for evaluating the position of a disturbance, in particular using a waveguide having a plurality of overlap regions. A position sensor is provided including: an optical waveguide; a transmission stage for launching a sensing signal into the waveguide; a receiving stage arranged to receive a returned sensing signals which returned sensing signal is a time distributed signal derived from backscattered components of the sensing signal, the waveguide being arranged along a path having a plurality of overlap regions such that a disturbance in an overlap region causes a first disturbance feature and a second disturbance feature in the returned sensing signal; and, monitoring means for monitoring the returned signal, such that a respective time of return can be associated with the first and second disturbance feature. Both return features can then be used to evaluate the position of the disturbance so as to enhance the resolution of the position sensor.

27 Claims, 6 Drawing Sheets

U.S. PATENT DOCUMENTS

| | | | |
|---|---|---|---|
| 4,572,949 A | 2/1986 | Bowers et al. | |
| 4,593,385 A | 6/1986 | Chamuel | |
| 4,649,529 A | 3/1987 | Avicola | |
| 4,654,520 A | 3/1987 | Griffiths | |
| 4,668,191 A | 5/1987 | Plischka | |
| 4,688,200 A | 8/1987 | Poorman et al. | |
| 4,697,926 A | 10/1987 | Youngquist et al. | |
| 4,708,471 A | 11/1987 | Beckmann et al. | |
| 4,708,480 A | 11/1987 | Sasayama et al. | |
| 4,770,535 A | 9/1988 | Kim et al. | |
| 4,781,056 A * | 11/1988 | Noel et al. | 73/800 |
| 4,805,160 A | 2/1989 | Ishii et al. | |
| 4,847,596 A * | 7/1989 | Jacobson et al. | 340/550 |
| 4,855,915 A | 8/1989 | Dallaire | |
| 4,885,462 A | 12/1989 | Dakin | |
| 4,907,856 A | 3/1990 | Hickernell | |
| 4,976,507 A | 12/1990 | Udd | |
| 4,991,923 A | 2/1991 | Kino et al. | |
| 4,994,668 A | 2/1991 | Lagakos et al. | |
| 4,994,886 A | 2/1991 | Nadd | |
| 5,004,912 A | 4/1991 | Martens et al. | |
| 5,015,842 A * | 5/1991 | Fradenburgh et al. | 250/227.15 |
| 5,046,848 A | 9/1991 | Udd | |
| 5,051,965 A | 9/1991 | Poorman | |
| 5,093,568 A | 3/1992 | Maycock | |
| 5,104,391 A | 4/1992 | Ingle et al. | |
| 5,140,559 A | 8/1992 | Fisher | |
| 5,173,743 A | 12/1992 | Kim | |
| 5,187,362 A | 2/1993 | Keeble | |
| 5,191,614 A | 3/1993 | LeCong | |
| 5,194,847 A | 3/1993 | Taylor et al. | |
| 5,206,924 A | 4/1993 | Kersey | |
| 5,223,967 A | 6/1993 | Udd | |
| 5,311,592 A | 5/1994 | Udd | |
| 5,313,266 A | 5/1994 | Keolian et al. | |
| 5,319,609 A | 6/1994 | Regnault | |
| 5,351,318 A | 9/1994 | Howell et al. | |
| 5,355,208 A | 10/1994 | Crawford et al. | |
| 5,361,130 A | 11/1994 | Kersey et al. | |
| 5,363,463 A | 11/1994 | Kleinerman | |
| 5,373,487 A | 12/1994 | Crawford et al. | |
| 5,379,357 A | 1/1995 | Sentsui et al. | |
| 5,412,464 A | 5/1995 | Thomas et al. | |
| 5,457,998 A | 10/1995 | Fujisaki et al. | |
| 5,473,459 A | 12/1995 | Davis | |
| 5,491,573 A | 2/1996 | Shipley | |
| 5,497,233 A | 3/1996 | Meyer | |
| 5,500,733 A | 3/1996 | Boisrobert et al. | |
| 5,502,782 A | 3/1996 | Smith | |
| 5,604,318 A * | 2/1997 | Fasshauer | 73/862.624 |
| 5,636,021 A | 6/1997 | Udd | |
| 5,637,865 A | 6/1997 | Bullat et al. | |
| 5,663,927 A | 9/1997 | Olson et al. | |
| 5,691,957 A | 11/1997 | Spiesberger | |
| 5,694,114 A | 12/1997 | Udd | |
| 5,754,293 A | 5/1998 | Farhadiroushan | |
| 5,767,950 A | 6/1998 | Hawver et al. | |
| 5,778,114 A | 7/1998 | Eslambolchi et al. | |
| 5,936,719 A | 8/1999 | Johnson | |
| 5,975,697 A | 11/1999 | Podoleanu | |
| 5,982,791 A | 11/1999 | Sorin et al. | |
| 5,991,479 A * | 11/1999 | Kleinerman | 385/31 |
| 6,072,921 A | 6/2000 | Frederick et al. | |
| 6,075,628 A | 6/2000 | Fisher et al. | |
| 6,115,520 A | 9/2000 | Laskowski et al. | |
| 6,194,706 B1 | 2/2001 | Ressl | |
| 6,195,162 B1 | 2/2001 | Varnham et al. | |
| 6,269,198 B1 | 7/2001 | Hodgson et al. | |
| 6,269,204 B1 | 7/2001 | Ishikawa | |
| 6,285,806 B1 | 9/2001 | Kersey et al. | |
| 6,315,463 B1 | 11/2001 | Kropp | |
| 6,459,486 B1 | 10/2002 | Udd et al. | |
| 6,594,055 B2 | 7/2003 | Snawerdt | |
| 6,625,083 B2 | 9/2003 | Vandenbroucke | |
| 6,628,570 B2 | 9/2003 | Ruffa | |
| 6,788,417 B1 | 9/2004 | Zumberge et al. | |
| 6,859,419 B1 | 2/2005 | Blackmon et al. | |
| 7,110,677 B2 | 9/2006 | Reingand et al. | |
| 7,397,568 B2 | 7/2008 | Bryce et al. | |
| 2001/0028766 A1 | 10/2001 | Hatami-Hanza | |
| 2002/0196447 A1 | 12/2002 | Nakamura et al. | |
| 2003/0103211 A1 | 6/2003 | Lange et al. | |
| 2003/0117893 A1 | 6/2003 | Bary | |
| 2003/0174924 A1 | 9/2003 | Tennyson | |
| 2004/0027560 A1 | 2/2004 | Fredin et al. | |
| 2004/0113056 A1 | 6/2004 | Everall et al. | |
| 2004/0201476 A1 | 10/2004 | Howard | |
| 2006/0256344 A1 | 11/2006 | Sikora et al. | |
| 2007/0009600 A1 * | 1/2007 | Edgren et al. | 424/473 |
| 2007/0065150 A1 | 3/2007 | Sikora et al. | |
| 2007/0264012 A1 | 11/2007 | Healey et al. | |
| 2008/0013161 A1 | 1/2008 | Tokura et al. | |
| 2008/0018908 A1 | 1/2008 | Healey et al. | |
| 2008/0123085 A1 | 5/2008 | Sikora et al. | |
| 2008/0166120 A1 | 7/2008 | Heatley et al. | |
| 2008/0219093 A1 | 9/2008 | Heatley et al. | |
| 2008/0219660 A1 | 9/2008 | Healey et al. | |
| 2008/0278711 A1 | 11/2008 | Sikora et al. | |
| 2009/0097844 A1 | 4/2009 | Healey | |
| 2009/0103928 A1 | 4/2009 | Healey et al. | |
| 2009/0135428 A1 | 5/2009 | Healey | |

FOREIGN PATENT DOCUMENTS

| | | |
|---|---|---|
| EP | 0 360 449 A2 | 3/1990 |
| EP | 0364093 | 4/1990 |
| EP | 0 376 449 A1 | 7/1990 |
| EP | 0 377 549 | 7/1990 |
| EP | 0513381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 2001-194109 | 7/2001 |
| WO | WO 93/25866 A1 | 12/1993 |
| WO | WO 97/05713 A1 | 2/1997 |
| WO | WO 01/67806 A1 | 9/2001 |
| WO | WO 02/065425 A1 | 8/2002 |
| WO | WO 03/014674 A2 | 2/2003 |
| WO | WO 2005/008443 A2 | 1/2005 |

OTHER PUBLICATIONS

U.S. Appl. No. 10/573,266, filed Mar. 23, 2006, Sikora et al.
U.S. Appl. No. 11/403,200, filed Apr. 13, 2006, Sikora et al.
U.S. Appl. No. 11/791,927, filed May 31, 2007, Sikora et al.
U.S. Appl. No. 11/791,923, filed May 31, 2007; Healey et al.
U.S. Appl. No. 11/663,954, filed Mar. 28, 2007, Sikora et al.
U.S. Appl. No. 11/663,957, filed Mar. 28, 2007, Healey et al.
U.S. Appl. No. 11/885,275, filed Aug. 29, 2007, Heatley et al.
U.S. Appl. No. 11/885,400, filed Aug. 27, 2007, Heatley et al.
U.S. Appl. No. 11/887,382, filed Sep. 28, 2007, Healey et al.
U.S. Appl. No. 11/918,434, filed Oct. 12, 2007; Healey et al.
U.S. Appl. No. 12/295,784, filed Oct. 2, 2008, Healey et al.
U.S. Appl. No. 12/280,051, filed Aug. 20, 2008, Healey.
U.S. Appl. No. 12/280,047, filed Aug. 20, 2008, Healey.
U.S. Appl. No. 12/280,038, filed Aug. 20, 2008, Healey.
Office Action dated Sep. 19, 2008 in U.S. Appl. No. 10/573,266.
Office Action dated Mar. 17, 2009 in U.S. Appl. No. 10/573,266.
Office Action dated Mar. 25, 2009 in U.S. Appl. No. 11/885,275.
Office Action dated Jul. 7, 2009 in U.S. Appl. No. 11/885,400.
Office Action dated Jan. 14, 2009 in U.S. Appl. No. 11/885,400.

Office Action dated Jan. 23, 2009 in U.S. Appl. No. 11/403,200.
Office Action dated Jun. 6, 2008 in U.S. Appl. No. 11/403,200.
Office Action dated Aug. 23, 2007 in U.S. Appl. No. 11/403,200.
Office Action dated Jul. 8, 2009 in U.S. Appl. No. 11/791,927.
Office Action dated Sep. 5, 2008 in U.S. Appl. No. 11/791,923.
Office Action dated Feb. 26, 2009 in U.S. Appl. No. 11/791,923.
International Search Report dated Nov. 22, 2005.
International Search Report for PCT/GB2005/003680 mailed Dec. 1, 2005.
International Search Report for PCT/GB2005/003594 dated Dec. 16, 2005.
International Search Report mailed Jan. 14, 2005 in International Application No. PCT/GB2004/004169.
International Search Report mailed May 29, 2006 in PCT/GB2006/000759.
International Search Report mailed May 8, 2006 in PCT/GB2006/000750.
International Search Report mailed Jun. 30, 2006, dated Jun. 7, 2006, in PCT/GB2006/001173.
International Search Report for PCT/GB2007/001188, mailed Jul. 17, 2007.
International Search Report mailed Apr. 13, 2007 in PCT/GB2007/000360.
International Search Report mailed Apr. 18, 2007 in PCT/GB2007/000343.
International Search Report mailed May 24, 2006 in PCT/GB2006/001325.
International Search Report mailed May 2, 2007 in PCT/GB2007/000359.
UK Search Report dated May 24, 2005 in GB506591.7.
International Search Report dated May 16, 2006 in PCT/GB2005/004850.
International Search Report dated Mar. 15, 2006, mailed Mar. 24, 2006 in PCT/GB2005/004873.
International Search Report mailed Dec. 16, 2005 in PCT/GB2005/003594.
UK Search Report dated Dec. 4, 2003 in GB Application No. GB 0322859.0.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates In Coherent OTDR," Electronics Letters, vol. 20, No. 11, May 24, 1984.
International Search Report mailed Sep. 15, 2005 in International Application No. PCT/GB2005/001269.
Office Action dated Aug. 3, 2009 issued in U.S. Appl. No. 10/594,433.
Applicant Response to Office Action dated Aug. 3, 2009 in U.S. Appl. No. 10/594,433.
Office Action dated Feb. 23, 2010 issued in U.S. Appl. No. 10/594,433.
Office Action dated Sep. 17, 2009 issued in U.S. Appl. No. 10/573,266.
Applicant Response to Office Action dated Sep. 17, 2009 issued in U.S. Appl. No. 10/573,266.
Notice of Allowance dated Jan. 26, 2010 issued in U.S. Appl. No. 10/573,266.
Office Action dated Jan. 23, 2009 issued in U.S. Appl. No. 11/403,200.
Applicant Response to Office Action dated Jan. 23, 2009 issued in U.S. Appl. No. 11/403,200.
Notice of Allowance dated Oct. 6, 2009 issued in U.S. Appl. No. 11/403,200.
Applicant Response to Office Action dated Jul. 8, 2009 issued in U.S. Appl. No. 11/791,927.
Office Action dated Jan. 26, 2010 issued in U.S. Appl. No. 11/791,927.
Applicant Response to Office Action dated Feb. 26, 2009 issued in U.S. Appl. No. 11/791,923.
Advisory Action dated Aug. 10, 2009 issued in U.S. Appl. No. 11/791,923.
Applicant Response to Advisory Action dated Aug. 10, 2009 issued in U.S. Appl. No. 11/791,923.
Notice of Allowance dated Sep. 21, 2009 issued in U.S. Appl. No. 11/791,923.
Office Action dated Nov. 13, 2009 issued in U.S. Appl. No. 11/663,954.
Applicant Response to Office Action dated Nov. 13, 2009 issued in U.S. Appl. No. 11/663,954.
Office Action dated Mar. 10, 2010 issued in U.S. Appl. No. 11/663,954.
Office Action dated Sep. 3, 2009 issued in U.S. Appl. No. 11/663,957.
Applicant Response to Office Action dated Sep. 3, 2009 issued in U.S. Appl. No. 11/663,957.
Office Action dated Mar. 8, 2010 issued in U.S. Appl. No. 11/663,957.
Applicant Response to Office Action dated Mar. 25, 2009 issued in U.S. Appl. No. 11/885,275.
Notice of Allowance dated Dec. 8, 2009 issued in U.S. Appl. No. 11/885,275.
Applicant Response to Office Action dated Jul. 7, 2009 issued in U.S. Appl. No. 11/885,400.
Notice of Allowance dated Mar. 3, 2010 issued in U.S. Appl. No. 11/885,400.

* cited by examiner

EVALUATING THE POSITION OF A DISTURBANCE

This application is the U.S. national phase of International Application No. PCT/GB2006/001993 filed 1 Jun. 2006, which designated the U.S. and claims priority to EP 05253394.0 filed 2 Jun. 2005, the entire contents of each of which are hereby incorporated by reference.

FIELD OF THE INVENTION

The present invention relates to a method of and apparatus for evaluating the position of a disturbance, in particular using a waveguide having a plurality of overlap regions.

BACKGROUND AND SUMMARY

It is known to use a waveguide to detect a disturbance. However, such known techniques are not always suitable in situations where it is important to detect the position of a disturbance with a high spatial resolution, in particular when the area within which the disturbance should be detectable is a large area.

According to one aspect of the present invention, there is provided a position sensor including: an optical waveguide; a transmission stage for launching a sensing signal into the waveguide; a receiving stage arranged to receive a returned sensing signal, which returned sensing signal is a time distributed signal derived from backscattered components of the sensing signal, the waveguide being arranged along a path having a plurality of overlap regions such that a disturbance in an overlap region causes a first disturbance feature and a second disturbance feature in the returned sensing signal; and, monitoring means for monitoring the returned signal, such that a respective time of return can be associated with the first disturbance feature and with the second disturbance feature.

From the respective return times associated with the first and second disturbance features, the overlap region from which the disturbance originate can be identified more accurately than by using the return time of the first or the second disturbance only.

The disturbance features may be distinguished visually and their return times noted, for example from a trace signal plotted as a function of time on a display. From the return times, a user may then perform a computation to determine in which overlap region the disturbance has occurred. Alternatively, an electronic or optoelectronic circuit may be used to record the respective return times and to determine, from the return times, the origin of the disturbance. One example of a disturbance feature may be a change in the amplitude of the returned signal, for example a step change with respect to time.

The waveguide will preferably be sensitive to disturbances within a sensing region around the waveguide, the extent or width of the sensing region being dependent on the sensitivity of the position sensor. The overlap regions will then preferably be determined by the area of overlap between, on the one hand, the sensing region of one portion of the waveguide and, on the other hand, the sensing region of another portion of the waveguide. The different waveguide portions will preferably intersect or otherwise overlap in an overlap region. However, the different waveguide portions need not themselves overlap, but may instead come sufficiently close to one another such that their respective sensing regions overlap in an overlap region.

Preferably, the path includes: a plurality of first sensing portions; a plurality of second sensing portions; and a plurality of respective self-crossing points, where each first sensing portion overlaps with each second sensing portion. The first sensing portions will preferably generally extend side by side in a first direction. Likewise, preferably, the second sensing portions will generally extending side by side in a second direction.

Preferably the first and second sensing portions will be arranged in generally straight lines. However, the sensing portions may follow a meandering or curved path, the first and second directions being determined by the respective start and end locations of each sensing portion. In one embodiment, the respective directions of the first and second sensing portions will be substantially orthogonal to one another. However, the angle between the direction of first and second sensing portions may be less than 90 degrees, for example about 30 degrees.

The self-crossing points may be disposed as a two dimensional array or along a one dimensional path, which path may or may not be a straight path. The array may be a regular array where the self-crossing points occur at regular intervals along the fibre path or at regular geographical intervals. If the array is a two dimensional regular array, the intervals in a first direction may be different to those in a second direction. However, for simplicity and to make it easier to determine the spatial location of a disturbance, the intervals will preferably be equal in both directions.

The sensing signals will normally have a resolution time associated therewith, which, if the signals are pulses, will be the duration of a pulse. A path resolution length can be associated with the resolution time, this being the spatial extend of the pulses as the pulses travel along the waveguide. Preferably, at least some neighbouring self-crossing points will be connected together by a plurality of paths, for example both a short path and a long path. The long path between at least some of the neighbouring self-crossing points will preferably be longer or substantially equal to the path resolution length, to more easily allow neighbouring self crossing points to be resolved. Preferably, the geographical separation of at least some of the neighbouring points will be less than the path resolution length, allowing the disturbances to be spatially resolved on a length scale that is less than the path resolution length. Yet more preferably, to reduce the length of waveguide required, the short path between at least some of the neighbouring self-crossing points will itself be less than the path resolution length.

The long portion between neighbouring self-crossing points situated near the centre of the array is likely to be longer than that between neighbouring self-crossing points near the array edge. For some neighbouring self-crossing points towards an edge of the array, the long path could even be less than the path resolution length, making such neighbouring points difficult to resolve. To alleviate this situation, a respective extension stage may be provided between adjacent first sensing portions and/or between adjacent second sensing portions. Such an extension stage will extend the length of the long path length. In one embodiment, the extension stages are each formed by a respective coiled portion of waveguide. Preferably, the extension stages will each be longer than the path resolution length, to make it easier for self-crossing points near or on the edge of the array to be resolved. However, in some situation, in may not matter that the self-crossing points on the edge of the array are not resolvable, in which case the extension stage may have a path length that is less than the path resolution length.

Each extension stage will preferably be formed from an extension portion of waveguide, the extension portion being integrally formed with the adjacent waveguide sensing portions. In one embodiment, each of at least the first sensing portions will be integrally formed, preferably with the extension portions if such extension portions are included. Preferably, the first and second sensing portions will be formed from a continuous waveguide.

Each extension stage may be protected from disturbances, so that detected disturbances can more clearly be associated with a self-crossing point. For example, if the waveguide is buried underground so as to extend across a sensing zone in which disturbances are to be located, each extension stage may be located outside the sensing zone where a disturbance is unlikely to occur, and/or may be shielded from disturbances by a protective region, such as a region formed from a concrete material or other hard material. Alternatively, the extension stages may be used to detect the presence of an entity entering the sensing zone. Since the extension stages will each be formed from a coil of fibre, the extension stages are likely to be more particularly sensitive.

Preferably, the sensing signal will be formed as a pair of signal copies from an optical source. A dynamic or other time-varying physical disturbance is likely to produced a strain or an elastic wave in the optical medium of the waveguide, thereby changing the relative phase of the signal copies travelling through the disturbance. Preferably, the signal copies of a given pair will be launched onto the waveguide with a temporal offset to one another, such that there is a leading copy and a trailing copy. As a result, the signal copies of a pair are likely to be differently affected by a disturbance. The temporal offset may be undone upon the return of the signal copies, preferably by delaying the leading copy relative to the trailing copy. Both copies of a given pair can then be combined substantially in step with one another, so as to form the returned sensing signal. Because the signal copies are combined, any modification of at least one of these copies is likely to produce a change in the returned signal, thereby facilitating the detection of a disturbance.

A dynamic disturbance may be stationary, that is, located at a stationary point. Alternatively, the dynamic disturbance may be a moving disturbance, such as that produced by a person, vehicle or other entity moving along a surface.

The source will preferably be configured to transmit optical pulses, each pulse giving rise to a pair of pulse copies. The pulses will preferably be transmitted in a repeat fashion, at time intervals. The time intervals will preferably be chosen in dependence on the total path length of the waveguide, such that the round trip time to the far end of the waveguide is less than the time intervals between signals. Each pulse may thus give rise to an associated time-distributed return signal, the duration of the return signal being commensurate with (twice) the transit time of a pulse along the waveguide path. To reduce the risk that the return signal from different pulses will overlap, the pulses will preferably be transmitted at time intervals, the duration of the intervals being longer than or substantially equal to the transit time of the pulses along the path, yet more preferably longer than or substantially equal to twice the transit time.

Preferably, the sensing signal will be returned predominantly by a process of Rayleigh backscattering. Being a distributed backscattering process, the Rayleigh backscattering will cause the sensing signal to be returned progressively as the signal propagates along the waveguide. However, other distributed backscattering processes due to the properties of the light guiding medium along (which properties are present in a substantially continuous fashion along the length of the waveguide) may also contribute to the return signal, since such processes will also normally give rise to a returned signal that is distributed over time.

The output signals from the source will preferably have an irregular component, in which case the irregular component may be common to each of the signal copies of a pair. Other characteristics of the signal need not be the same in each signal copy: for example, the signal copies may have different amplitudes. The irregular component will preferably be random, or pseudo random (by pseudo random, it is meant that although in theory a component is possible to predict, the time or processing power required to do this will make it in practice impossible to predict). If the output signal has a waveform, the irregular component may be provided by the phase of the waveform if the waveform has randomly occurring phase changes. The waveform may conveniently be provided by an optical source having a short coherence time, preferably less than 10 pico seconds or even less than 1 pico second. The returned signal will preferably be an interference signal resulting from the interference or mixing of two waveforms.

A copying stage may be provided to copy the output from the source, and a combination stage for combining returned signal copies. In a preferred embodiment, the copying stage and the combination stage will be provided by a common optical junction. In particular, an interferometer stage, such as an un-balanced Mach Zehnder interferometer may be provided. In this preferred embodiment, the output from the optical source is fed to the interferometer, where the signal is copied, one copy being channeled to one path of the interferometer, the transit time associated with each path being different, such that a relative or differential delay results between the time at which the signal copies are transmitted from the interferometer stage. The same interferometer stage can then be employed to re-align the returned signal copies in a particularly convenient manner, since the relative delay imposed in the outbound direction will be the same as the relative delay imposed in the return direction, this being in each case determined by the difference in the transit times of the two paths.

The differential delay will preferably be chosen in dependence at least in part on the average coherence time of the source. The differential delay will preferably be much longer than the coherence time. Preferably, the ratio of the differential delay to the coherence time will be greater or equal to $10^2$ or $10^3$. The differential delay will preferably be at least 50 micro seconds, as it has been discovered that a long differently delay is beneficial in the detection the low frequencies typically associated with acoustic vibrations due to mechanical disturbances brought about my the movement of persons of vehicles along the ground surface. However, detection of low frequency disturbances can be improved yet further with a differential offset time of at least 75 micro seconds, or even 100 micro seconds (100 micro seconds corresponding to a distance of around 20 km for the differential path length of the interferometer if the interferometer legs are formed by silica glass single mode optical fibre).

The steps of copying output signals and transmitting the signals will preferably be carried out at a first location, a disturbance remaining detectable at distance of at least 1 km or even at least 10 km from the first location. The path length of the waveguide of the position sensor may be 100 km or more, allowing areas on the scale of at least several square km to be sensed, with the sensing points being placed reasonably close to one another.

According to another aspect of the present invention, there is provided method of sensing position, including the steps of: (i) transmitting a sensing signal along a waveguide; (ii) monitoring a returned sensing signal, the returned sensing signal being derived from components of the sensing signal that are returned by a process of distributed backscattering as the sensing signal propagates along the waveguide, wherein the waveguide is arranged along a path having a plurality of overlap regions such that a disturbance in an overlap region causes a first disturbance feature and a second disturbance feature in the returned sensing signal, which first and second disturbance features correspond to respective spaced apart positions along the fibre path; and, (iii) using a temporal characteristic in the first and second disturbance features to determine which of the overlap regions the disturbance originates from.

The returned signals will preferably be monitored as a function of the elapsed time from a reference time, which reference time will be related to the time at which the pulse is generated. A temporal characteristic in the returned signal may be a return time associated with the disturbance feature, in particular the arrival time of returned signal copies (once combined) responsible for a disturbance feature. Thus the return time may be the round-trip time (subject to a possible offset) for light propagating to and from the position of the physical disturbance.

BRIEF DESCRIPTION OF THE DRAWINGS

The present invention will now be described in further detail below, by way of example only, with reference to the following drawing in which.

DETAILED DESCRIPTION

Figure 1:
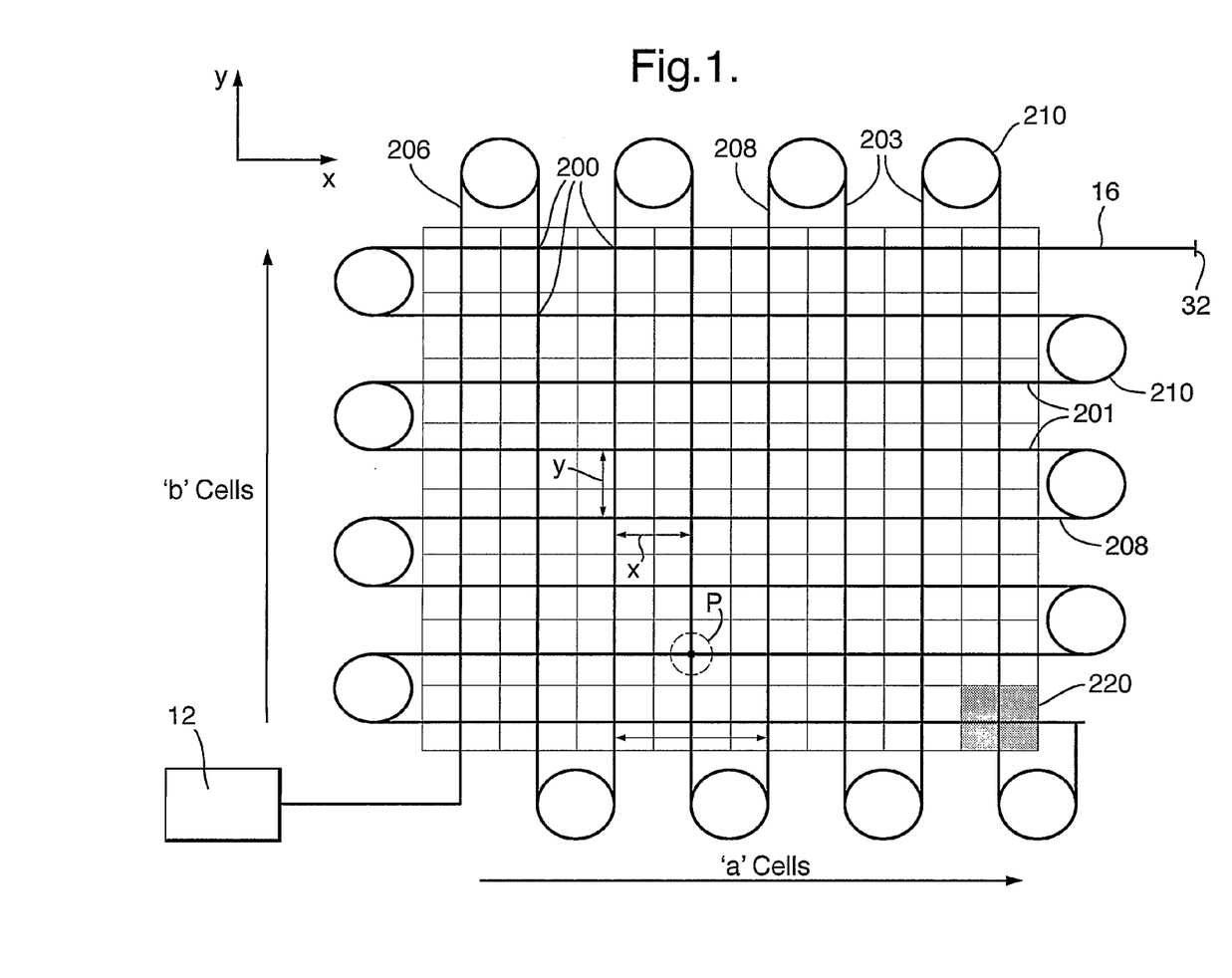
FIG. 1 shows on optical position sensing system with a monitoring station, according to the present invention.

FIG. 1 shows a position sensor 10 in which a monitoring station 12 is connected to an optical fibre 16. The optical fibre 16 is arranged along a path having a plurality of self-crossing points 200. A sensing area P extends around each self crossing point, such that if a dynamic disturbance occurs in one of the sensing areas, the sensing area from which the disturbance originates can be identified, allowing the position of the disturbance to be determined.

In general terms, the monitoring station 12 is arranged to transmit sensing pulses onto the fibre 16, which sensing signals will suffer a phase change or other modulation by the dynamic disturbance. Components of the sensing pulses are returned by a process of Rayleigh backscattering along the fibre, such that for each pulse produced by the source, the returned signal is distributed over a time corresponding to the transit time of the pulse copies along the fibre.

Backscattered components returned to the monitoring station 12 are processed to distinguish the modulation introduced by the dynamic disturbance. The position of the disturbance along the fibre path can be determined from the time of return of modulated backscattered components, since backscattered components returned from different regions of the fibre arrive at the monitoring station 12 at different times. This can conveniently be achieved by viewing the returned signal as a function of time, in the manner of a trace on a display, since the modulation produced by a disturbance will normally be distinguishable as a step change or other disturbance signal in the trace.

However, the finite duration of the pulses from the source can result in an uncertainty as to the precise position of the disturbance along a fibre. In the present invention, the risk of such an uncertainty is reduced by the presence of the self crossing point in each sensing area. Due to the self crossing points, a disturbance in a sensing area will disturb the fibre at a plurality of positions along the fibre path, here two positions, giving rise to two time-separated disturbance signals at the monitoring station. As will be explained in more detail below, these two time separated signals can be used to more accurately determine which sensing area is responsible for a disturbance.

Returning to FIG. 1, the fibre path includes a plurality of lateral (first) fibre portions 201 and a plurality of longitudinal (second) fibre portions 203. The lateral fibre portions 201 extend generally parallel to one another in a side-by-side arrangement along the direction marked X. Likewise, the longitudinal fibre portions 203 extend generally parallel to one another along the direction marked Y, the direction of the lateral portions being generally orthogonal to the direction of the lateral portions, such that the lateral and longitudinal portions intersect one another at the self-crossing points 200. The lateral portions are regularly spaced apart with a separation y, whilst the longitudinal portions are regularly spaced apart with a separation x from one another, the self-crossing points thereby forming a regular array. In this example, the x and y separations are equal, although the array could have different or irregular spacings. The longitudinal portions are connected together by respective U-shaped connecting portions 206. Likewise, the lateral portions are connected by similar U-shaped connecting portions 208, such that the longitudinal and lateral fibre portions together form a continuous optical path.

Each sensing area P extends around each respective self-crossing point, indicated in FIG. 1 with reference to one self-crossing point by a dotted line. The sensing area will be formed by the overlap of the respective sensing widths of the intersecting fibre portions (although for simplicity the sensing area is shown as being circular, the sensing area may in practice have a different shape). As a result, the disturbance will be sensed by both the longitudinal and the lateral fibre portion which intersect in that area.

Figure 7:
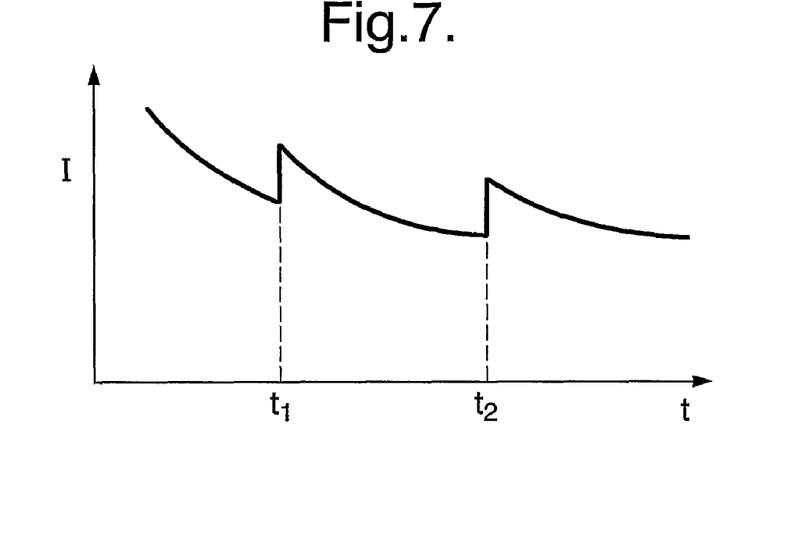
FIG. 7 shows schematically an expected return signal with two disturbances.

FIG. 7 shows, schematically, a possible trace resulting from a disturbance near the self-crossing point marked P in FIG. 1. The trace has a first disturbance feature at time t1 due to the disturbance sensed by the lateral fibre portion at P. Time t1 corresponds to the round-trip time for a light pulse to reach position P and return to the monitoring station along the lateral fibre portions. A second disturbance feature occurs at a later time t2, due to the disturbance sensed at the longitudinal fibre portion at P. This second disturbance feature is thus the result of pulses which have traveled beyond the point where the lateral portion intersects P, and sufficiently far to reach the point where an longitudinal portion intersects position P. If the resolution of the monitoring station was sufficiently high, it would, in principle, be possible to determine the position of the disturbance from the first (or the second) disturbance feature alone. However, the path resolution is limited by the duration of the pulses from the interferometer: short pulses provide a higher resolution along the fibre path than long pulses, but give rise to a weaker return signal. Thus, in practice, the distance of a disturbance point as measured along a fibre path will only be known to within an accuracy determined by a path resolution length L, the resolution length normally being governed by the spatial extent of the sensing pulses travelling along the fibre, which in turn will depend on the duration of the pulses.

In the example of FIG. 1, the path resolution length L is equal to twice the separation between self-crossing points (as measured along the lateral fibre portion). Therefore, from the time position t1 of the first disturbance feature alone, the disturbance could be inferred to have arisen at either of the self crossing points P' and P''' either side of P on the lateral fibre portion intersecting P. However, this ambiguity can be resolved from the time position of the second disturbance feature at t2, since, as measured along the longitudinal portion, the longitudinal portion only intersects that particular lateral portion once in a path length interval corresponding to the resolution length L (the path length interval being measured along the longitudinal portion). In this way, the spatial resolution of the array, that is, the accuracy with which the geographical position of disturbance can be determined, may be increased beyond the resolution length L along the fibre path. (The longitudinal portion could intersect the lateral portion more than once in the length L, but this would normally not be helpful).

Figure 8:
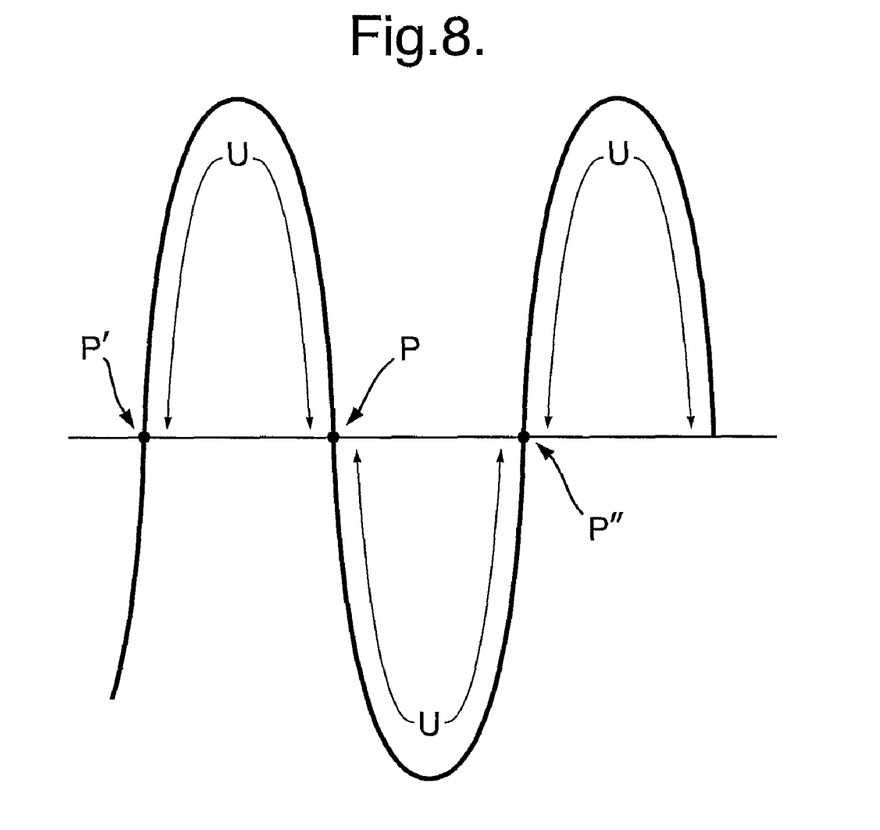
FIG. 8 shows possible path for an optical waveguide

These considerations can be understood more clearly with reference to FIG. 8, which shows a fibre path having just a single lateral fibre portion, intersected by longitudinal fibre portions at respective points P, P' and P'''. Considering first the self crossing points P and P''', these are connected along a short path formed by the lateral fibre portion, and along a long path formed by the longitudinal fibre portions. Likewise, points P and P' are also each connected by both a long path and a short path. Provided that the path length U of the long path between a pair of neighbouring crossing points P and P''' (or P and P') is longer than the resolution length L, it will be possible to determine the position of a disturbance as between one or the other of the pair of crossing points: that is, it will be possible to distinguish whether the disturbance originates at P or P' (or P and P'''), even if the short path between the neighbouring self-crossing points is less than L.

Clearly, in the two dimensional array of FIG. 1, the long path length U between two self-crossing points will depend on how close to the edge of the array the two points lie. At the very edge, for example the top edge in the orientation of FIG. 1, the long path between neighbouring self-crossing points along the lateral fibre portion will just be the length of the curved connecting portion 206 which connects the neighbouring self-crossing points. Thus, for self-crossing points along an edge, the spatial resolution of the array as measured in the direction of that edge may be reduced. However, for neighbouring self-crossing points towards the centre of the array, the long path between them is likely to be greater than the resolution length L, in particular if the array is a large area array. Therefore, the self-crossing points towards the edges of the array may be more prone to ambiguity than the self-crossing points towards the array centre.

To allow even the self-crossing points along an edge to be resolvable, an additional respective extension portion 210 may be introduced between adjacent longitudinal portions, and between adjacent lateral portions, as indicated in FIG. 1. Such extension portions will provide an additional delay between self crossing points. Here, each extension portion is formed by a coiled portion of optical fibre. However, a high spatial resolution may only be needed in certain regions of the array, in which case the extension portions need not be provided, the long path between neighbouring self-crossing points itself providing sufficient delay. Alternatively, extension portions may only be provided along one edge of the array, or in edge regions where a high spatial resolution is needed.

The path length of each extension portion will be greater than the path resolution length L, which is in turn determined by the pulse duration. For a pulse duration of 1 micro second, the resolution length will be about 200 meters, assuming light travels along the (single mode) fibre at a speed of 2×10 E8 meters per second (at a typical wavelength of 1440 nano meters). The length of each extension portion will thus be about 200 meter or more. For a pulse duration of 0.5 micro seconds, the additional delay length need only be about 100 meters or more.

The spatial resolution of the array will depend at least in part on the geographical separation between the self-crossing points. Clearly, the self crossing arrangement will be of particular benefit when the path resolution length L is greater than the spatial separation D or the shortest path length between self crossing points, since path distances which would not otherwise be resolvable will become resolvable due to the presence of the self-crossing points. Although coiled extension portions of fibre may be provided between self-crossing points, even away from the array edges, these will not normally be necessary.

By reducing the separation D between self-crossing points, the spatial resolution of the array will generally be increased. However, if the self-crossing points are too close, a sensing area of one self-crossing point will overlap with the sensing area from an adjacent self-crossing point. The extent of a sensing area will depend on several factors, including: the sensitivity with which disturbances can be detected; the distance of the array from the point or plane where disturbances are generated; the nature or the configuration of the medium between a disturbance point and the array; and, the magnitude or strength of the disturbances. Normally, the extent of the sensing area will be determined by trial and error for the particular environment in which the array is to be used.

The array may be located beneath the ground surface, so as to detect the position of a person, vehicle, object or other entity moving along the surface. The array will be arranged such that the acoustic vibrations generated by the movement will impinge upon the fibre at a self crossing point, the sensing areas of adjacent self-crossing points being chosen such that the sensing areas border one another, being sufficiently close to reduce the area not covered by a sensing area, but not so close that sensing areas significantly overlap. From a knowledge of the geographical configuration of the fibre path and identity of the self-crossing point at which a disturbance has been detected, it will be possible to infer the position of the moving entity. Other configurations for monitoring or determining the position of moving entities are possible: for example, the array may be located in a fluid medium to detect the position of an entity moving through the medium.

The array may be located in a sensing zone, to detect the position of a disturbance within the zone, typically over 1 or over 10 square km. The zone may be conceptually divided into sensing cells, each cell including a self-crossing point (the sensing cells are delineated in FIG. 1 by dotted lines, one sensing cell 220 being highlighted). Thus, provided it is possible to determine from which self-crossing point a disturbance originates, it will be possible to determine the cell in which the disturbance is located. In this way, position will be determined in a granular fashion, the granularity being determined be the size of the sensing cells: the sensing cells thus behave a resolution cells. If the disturbance moves, the movement can be tracked in a discontinuous or stepped fashion, the size of the steps again being determined by the size of the sensing cells.

If the dimensions of the sensing cells in the X and Y directions is r, and the length of each extension coil is R, then the total length of fibre required is given by [R·(a+b−1)+ 2·a·b·r] where a and b are the number of square cells in the directions X and Y. This compares to [R·a·b+r·(a+b−1)] for a non-crossover grid where a coil of length R is required in each grid cell. For example, a 50×50×1 m grid cell pattern, with would require 9.95 km of fibre to wire up using this pattern, compared to over 125 km for the non-cross-over design, assuming R=50 m.

Figure 2:
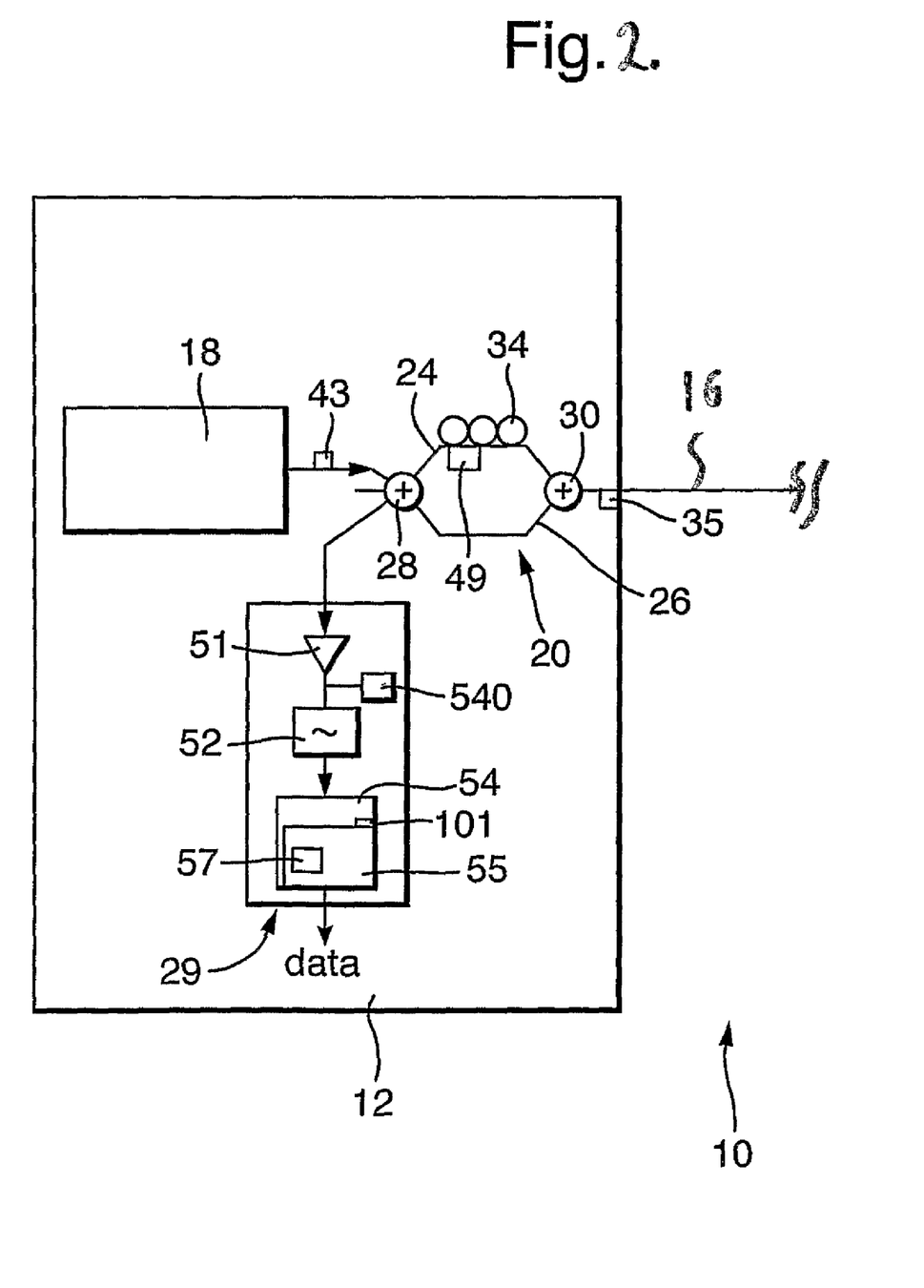
FIG. 2 shows in more detail the monitoring station of FIG. 1.

The monitoring station 12 is shown in greater detail in FIG. 2. The monitoring station includes an optical pulse source 18 with a short coherence time (random phase changes in the output providing an irregular component to the signal), the pulse source being driven by a driver unit 118. Pulses from the optical source 18 are fed to an interferometer stage 20, here a Mach Zehnder interferometer with a first path 24 and a second path 26, the paths 24, 26 being coupled at each end by a respective first and second coupling stage 28, 30. For light travelling in the outbound direction, the first coupling stage 28 acts as a directional power (intensity) splitter, channeling light from the optical source 18 to each of the paths 24, 26, the power to each path being shared in a predetermined manner (here, the first coupling stage acts as a 50:50 power splitter, although a different ratio could be used).

Thus, for each pulse provided by the optical source 18, that pulse is copied such that there is a first copy and a second copy, the first and second copies being in this example duplicates of one another. One copy travels along the first path 24 whilst the other copy travels along the second path 26. The second coupling stage 30 is coupled to an output 35 of the interferometer, which output is connected to the fibre 16. The second coupling stage 30 acts as a combiner for light travelling in the outbound direction, channeling light from the first and second paths to the interferometer output 35. The first path of the interferometer has a delay stage 34 for increasing the transit time of light travelling therealong between the first and second coupling stages 28,30, the transit time for light travelling between the coupling stages 28,30 being greater along the first path 24 than along the second path 26. Thus, for each pulse produced by the optical source, the interferometer 20 serves to delay one of the pulse copies relative to the other pulse copy by a delay time D, pulse copies being transmitted onto the optical fibre network 16 at different times to one another.

For signals travelling in the return direction, the second coupling stage 30 act as a power splitter, in a similar fashion to the action of the first coupling stage 28 on light in the forward direction (from the optical source 18). In this way, the intensity of return signals is split at the second coupling stage 30, one portion being channeled along the first path 24, whilst the other portion is channeled along the second path 26. The first coupling stage 28 then serves to combine light from the first and second paths in the return direction, channeling the combined light as an interference (combination) signal to a signal processing system 29 coupled to an output of the first coupling stage 28.

The signal processing system includes: a photo-receiver 51 coupled to the first coupling stage 28 for converting optical signals into electrical signals; a filter 52 for receiving electrical signals from the photo-receiver 51 and filtering the electrical signals; a first signal processing unit 54 for processing the filtered electrical signals; and an optional further processing unit 540 for performing more detailed processing of the electrical signals. The filter 52 bandwidth (about 1 MHz) is matched to the expected signal bandwidth in order to minimise extraneous noise.

Figure 4:
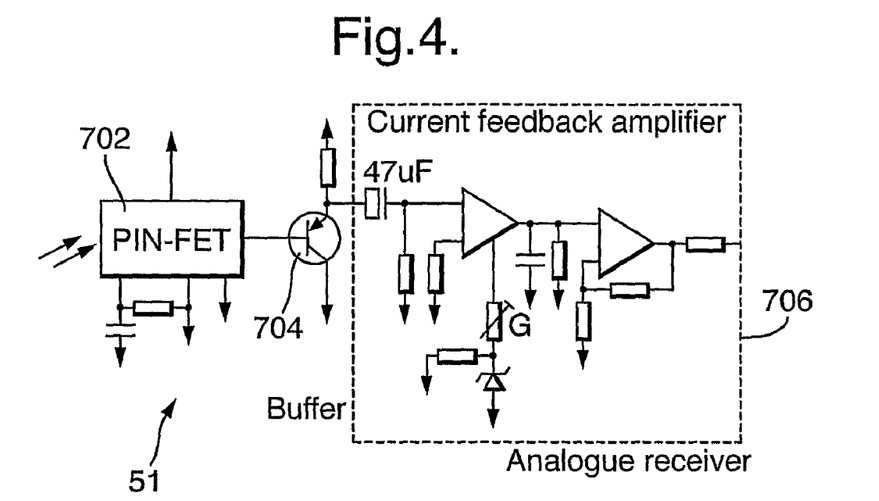
FIG. 4 shows a photo receiver circuit.

The photo receiver 51 is shown in more detail in FIG. 4. Light from the coupler 28 is incident on a photo transistor 702, here a PIN-FET, which produces an electrical output that is fed to a bipolar transistor 704, acting as a buffer, before being fed to a variable gain current feedback amplifier 706. The light source 18 may be a Light Emitting Diode, a source of amplified spontaneous emission such as an Erbium-Doped Fibre Amplifier, a Semiconductor Optical Amplifier, or a Super Luminescent Diode since this has a broad and smooth power spectrum and a short coherence time of about 0.5 ps or less. However, a Fabry-Perot Laser Diode is preferred, as described later with reference to FIG. 5.

The radiation produced by the optical source may be unpolarised, or alternatively a de-polarising unit 43 may be provided between the light source and the interferometer, for depolarising the light before the light is injected into the interferometer (the de-polarising unit may be for example, a Fibre Lyot de-polariser). A polarisation controller or de-polariser 49 may be provided in one of the paths of the interferometer, here, the first path, so that the polarisation of light from the first path combining in the return direction at the first coupler 28 is at least partially aligned with that of the light from the other path. A de-polariser also has the advantage of effectively scrambling any polarisation structure in the returning backscatter signal making it much easier to detect loss defects.

Typically, the source will operate at a wavelength of between 1 micron and 2 microns, preferably around 1.3 or 1.55 microns, in order to efficiently make use of standard telecommunications optical fibre, such fibre being configured to support single mode transmission at this wavelength. Typically, the fibre will have a single core of a diameter which is around 9 or 10 microns.

The operation of the monitoring station 12 can best be understood by considering return components of outbound pulse copies returned from a particular point on a fibre. For each pulse generated by the source 18, there will be four resulting signals: a non-retarded signal S0 which has traveled along the second path 26 of the interferometer 20 in both the forward and reverse directions: a first retarded signal S1 delayed by a delay D in the forward direction (but not the reverse direction): a second retarded signal S2 retarded by the delay D in the reverse direction (but nor the forward direction): and, a twice-retarded signal S3 retarded by a delay 2D, signal S3 being retarded in each of the forward and reverse directions.

The first and second retarded signals S1, S2 which are retarded in one direction only will be returned to the first coupling stage 28 at the same time. In the absence of any disturbance in the fibre 16, these signals are copies of one another (i.e. have the same phase or phase changes) and the signals will interfere or otherwise combine constructively at the first coupling stage 28. However, a phase change on light travelling through the fibre will normally be effected by a physical disturbance. This is because a physical disturbance (caused for example by a displacement, an acoustic or ultrasound wave or other vibration) is likely to result in a change in the transmission properties of an optical fibre or other optical link. In particular, a physical disturbance such as that cause by a shock is likely to result in a time varying strain which will change the optical path length in the strained region of the light-carrying medium of the fibre (normally the silica glass core of the fibre), either through a change in the refractive index, polarisation, or a change in the physical length, or a combination of these. As a result of a time-varying disturbance, one of the pair of the signals S1, S2 will be modified relative to the other of the pair. This will result in a change in the interference signal from the first coupling stage. In particular, a relative phase change in the signals S1, S2 will result in an amplitude change of the interference signal at an output of the first coupling stage.

In order to display the interference signal as function of time in the manner of a trace, the processing unit 54 includes a processor/memory circuit 55. The processor/memory circuit is connected to the driver 118 of the optical source 18, for accessing the electrical pulse signals which drive the source 18. The processor/memory circuit includes timer means, here a timer unit 57, which indicates the elapsed time after the transmission of each pulse from the source, the timer unit being configured to reset using the pulse signals when a new optical pulse is launched. The processor/memory circuit 55 is connected to the bandpass amplifier 51 so as to received the interference signal in the electrical domain, and to store the signal from each pulse as a function of elapsed time from the generation of the pulse. To store the interference signal as a function of time, the processor/memory circuit 55 is configured to sample the interference signal at intervals, and to store each sample with the associated return time. The stored interference signal can then be viewed on a viewing device 101. However, the interference signal may be stored temporarily, for example through the remnance of a cathode display.

Figure 6:
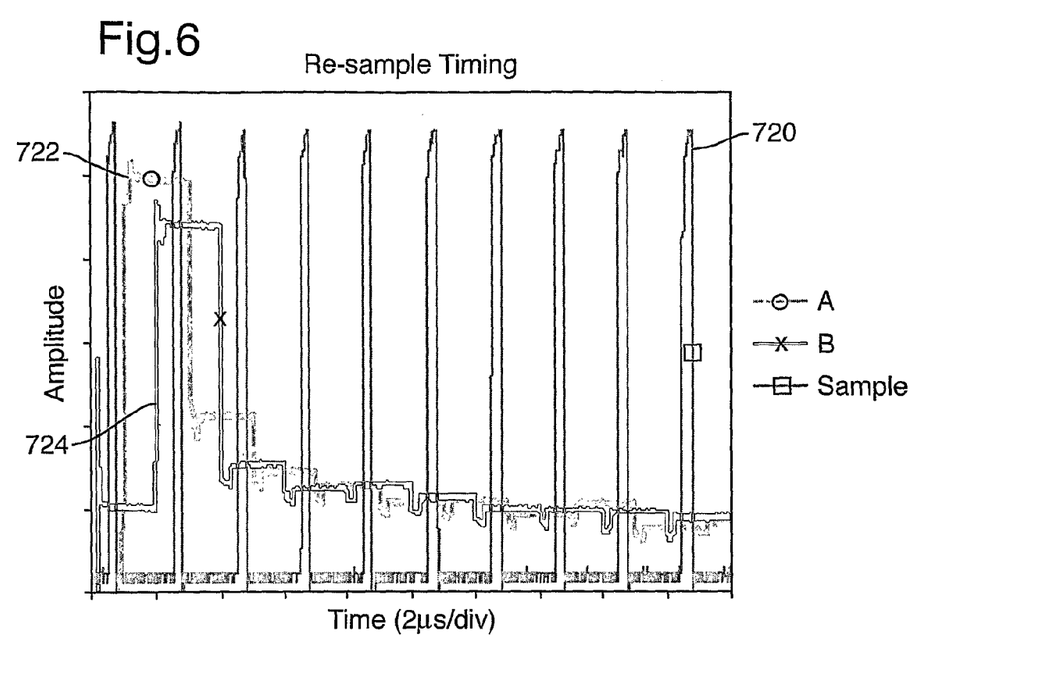
FIG. 6 shows for illustration purposes a measured return signal with just one disturbance.

With reference to FIG. 6 and to illustrate the operational principles behind the position sensing system, a situation will be considered where a disturbance occurs along the fibre path at a position X between self-crossing points. In this example, the disturbance is sensed at one point along the fibre rather than at a plurality of points along the fibre, as would be the case in the vicinity of a self-crossing point.

Trace A of FIG. 6 shows how the interference signal (or equivalently the return signal) resulting from a transmitted pulse varies with elapsed time from the transmission of the pulse from the source (trace B is for a stronger disturbance). Each point along the trace corresponds to a position along the fibre at which the signal responsible has been returned. Initially, the pulse copies will have suffered little attenuation through backscattering or loss. Therefore the intensity of the backscattered components, which is related to the intensity of the pulses, is high and the interference signal is also high. As the pulse copies travel along the fibre, the pulses are attenuated, as well as the backscattered components, with the result that the interference signal diminishes with time.

After a time t1, returned backscattered components will have originated from pulses which have traveled beyond the position X. When the pulse copies or the backscattered components pass through position X, the phase of the backscattered components resulting from the pulse copies will be affected by the disturbance. Because the disturbance changes with time, the relative phase of the backscattered components of a given pair of pulse will be changed, resulting in a sharp change in the interference signal at the time t1. Likewise, returned components from the pulses which have traveled beyond X will also be affected. Hence the trace remains shifted after time t1 in a step-like fashion. Since the time t1 corresponds to the round trip time to the first sensing location and back, the distance along the fibre path of the point X can be inferred from the value of t1 (or the value t1 relative to a reference time which includes an offset, for example the offset due to the delay line 34 of the interferometer).

The pulses from the source will be transmitted in a repetitive fashion, preferably every 1 ms, the duration of each pulse being 1 μs. Alternatively, for a higher resolution, the pulses may be 0.5 μs long.

The delay line will preferably be at least 20 km since for shorter length and when a disturbance is small (i.e., such that the fibre phase changes respond linearly), the interferometer system becomes less sensitive when the disturbance frequency is low. With a delay line of about 20 km (which corresponds to a delay of about 100 μs), the pulse (signal) copies will be spatially distinct as they travel along the fibre, since the pulses are typically of 1 μs duration, sent every 1 ms. However, for longer pulses, or a shorter delay, signal copies of a given pair may overlie one another (the division between signals may be conceptual: for example, for a continuous signal, the signals would not each be a discrete entities, since consecutive signals will be joined seamlessly as a continuous waveform).

In one embodiment, the occurrence of a disturbance is first detected using a continuous optical signal, reflected from a mirrored end surface 32 of the fibre. Essentially, the apparatus of FIG. 1 can be used but with a source that produces a continuous signal rather than pulses. The signal is returned from the outstation, and recombined at the interferometer in a similar fashion to the pulses. However, with a continuous signal a bandpass amplifier 52 can be used that has a lower bandwidth (about 100 kHz) than that required for backscattered pulses, with the result that the interference signal will be less noisy, thereby allowing for a more sensitive detection of disturbances. Furthermore, with a continuous signal, the returned signal can be integrated over a time period, since positional resolution is not needed for the detection of a disturbance. Once a disturbance has been detected, its position can be established as explained above. Nevertheless, as is clear from FIG. 6, it is possible to determine the occurrence itself of a disturbance using a pulse rather than a continuous signal.

Figure 3:
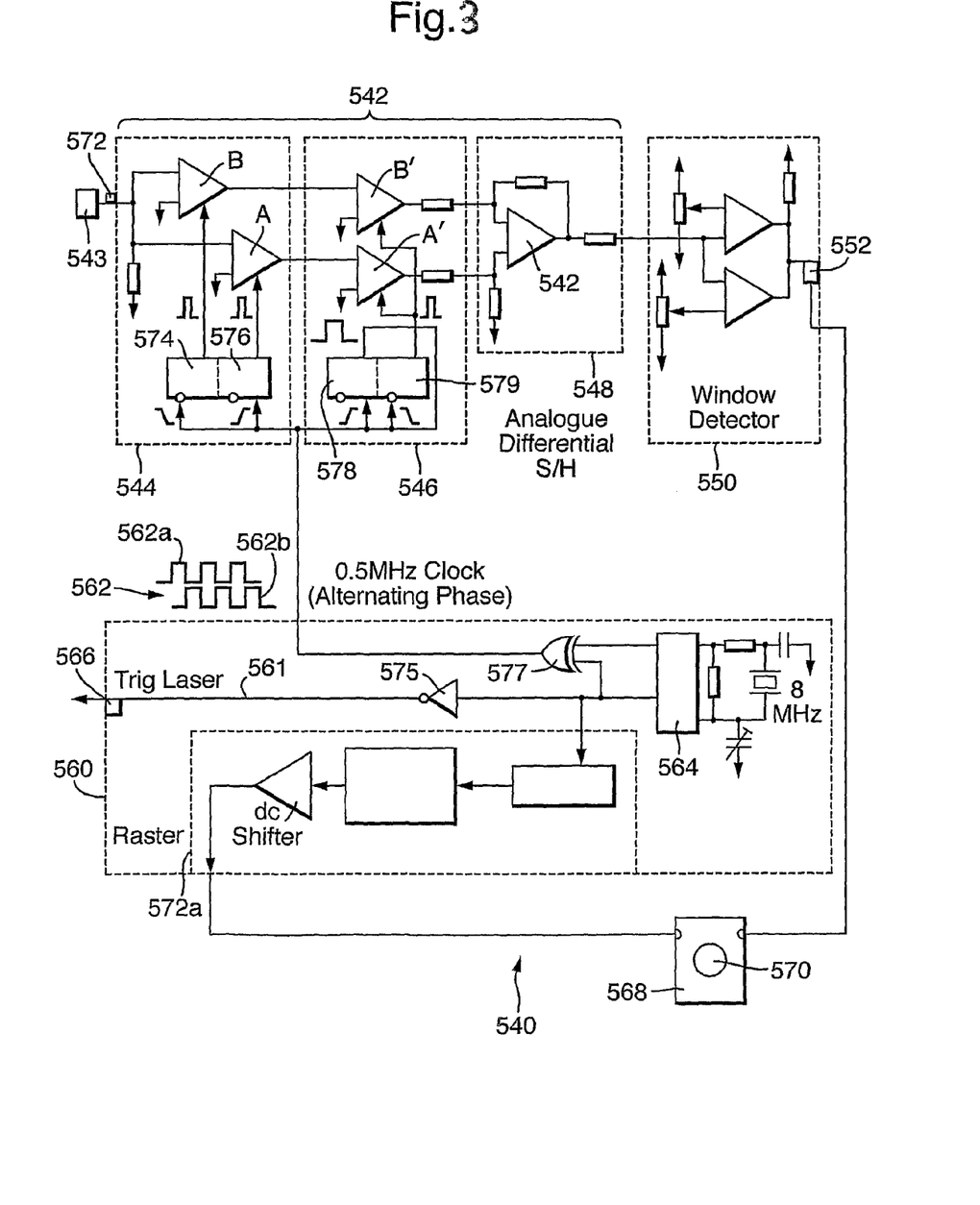
FIG. 3 shows a signal processing circuit for use in the monitoring station of FIG. 2.

FIG. 3 shows a further signal processing unit 540. In a similar fashion to the first signal processing unit 54, the further signal processing unit 540 is suitable for evaluating, on the basis of Optical Time Domain Refletometry (OTDR), the distance of one or more disturbances along the link 16. Although in FIG. 1 the further signal processing unit 540 is shown as an additional unit to the first processing unit 54, in practice just the further processing unit 540 may be implemented the monitoring station.

In general terms, the further signal processing unit 540 is configured to process the interference signal originating from a first location using the interference originating from a second location, the second location being positioned upstream of (that is, nearer the monitoring station than) the first location. In practise, this is done by sampling the return signal at a first time and at a second time, and evaluating the difference between the two sampled signals. This approach recognises that the interference signal from the first location may include contributions from the second location, since the pulses (and returned components thereof will pass through the first location to reach the second location.

The further signal processing unit 540 includes a sampling unit 542, here an analogue differential sample and hold circuit, which circuit is connected to the filter 52 at an input 543. The sampling unit 542 is configured to sample the incoming signals from the MZ coupler 28, in particular from the filter 52 which in turn receives signals from the photo receiver 51. The sampling unit 542 includes: a sampling stage 544 configured to sample the incoming signals at spaced apart time positions; and alignment stage 546 for aligning the signals previously sampled at spaced apart positions; and, a comparison stage 548 for comparing the re-aligned signals, in particular for evaluating the difference between the signals. Signals from the comparison stage 548 are passed to a window detector circuit 550, configured to generate an output at a signal output 552, in particular if the output signal from the comparison stage 548 departs from a centre value by more than a threshold value.

A timing control circuit 560 is included for providing trigger signals 561 for triggering the driver unit of the optical source 18 such that the source emits a pulse in response to each trigger signal. The timing control circuit 560 also generates clock pulses 562 which clock pulses control the operation of the sampling unit, in particular the sampling stage 544 and 546. The trigger signals 561 and the clock pulses 562 are generated by a common timing source 564, which may for example be a clock circuit. The trigger signals 561 may be tapped at a trigger output 566 and are fed to the trigger of an oscilloscope 568. The signal output 552 can then be fed to a signal input of the oscilloscope 568, which is preferably a storage oscilloscope, and viewed on a display 570. A raster circuit 572a may be provided to generate a raster signal which can be fed to the oscilloscope for generating a two-dimensional display. Further gates 575 and 577 are included in the timing control circuit as indicated in FIG. 2.

The clock pulses in the present example are at a frequency of 0.5 MHz and are of the alternating phase type, that is, a wave train is generated with one phase 562a, and another train is generated at a phase shift of 180 degrees. The timing control circuit is configured such that the clock phase alternates on every trigger pulse to the optical source 18, and also synchronises the raster generator for generating the two-dimensional display. The two-dimensional representation will allow the time-evolution of the backscatter signal from each position in the fibre to be observed on the display 570 of the storage oscilloscope 568. The digital and analogue electronics used separate, regulated and de-coupled power supplies (in FIG. 3, upward pointing arrow indicates a connection to a positive supply rail, whilst downward pointing arrows show a connection to ground or the negative supply rail).

In more detail, the sampling unit 542 includes a copying stage 572, which could be a simple "T" connector, for generating copies of the input signal (that is, the OTDR signal or a signal equivalent to the interference signal in the electrical domain). The sampling stage 544 has two sampling amplifiers A, B, each of which are triggered to sample by a respective pulse unit 574, 576, the pulse units being fed with clock pulses from the timing control circuit 560. The copies A and B each respectively enter amplifiers A, B, where respective discreet-time pulse amplitude copies are generated. The pulse units 574, 576 are arranged such that the sampling instance of the two copies (A and B) is offset by a range resolution interval, here one microsecond. The signals from sampling amplifiers A, B are then passed respectively to further sampling amplifiers A' and B' of the alignment stage 546, where these samples are then re-sampled.

The further sampling amplifiers A', B' or equivalently sampling gates are triggered by respective pulse units 578, 579 (the pulse units 578, 579 being driven by clock pulses from the timing control unit 560). The further amplifiers A', B' are operated in such a way (through the timing of the pulse units 578, 579) that the re-sampled signals of the A copy precede the sampled signals of the B copy: this means that the A samples originate from a range resolution cell which immediately precedes that of the B signal. The result of this re-sampling strategy is that sampling points "walk" along the fibre link 16 (separated by a distance corresponding to one microsecond), but with a step size of two microseconds (assuming the pulse initially transmitted by the optical source onto the fibre link 16 are one microsecond in duration).

The comparison stage 548 includes a difference amplifier 549 for evaluating the difference between the twice sampled signals A and B: that is, the output of the difference amplifier gives an output related to A-B. Because the A and B traces are re-aligned before being compared, it may be considered that the a values related to slope or gradient of the time-dependence of the signals is obtained. Effectively, the time-dependent sampled signals are differentiated: that is the difference between neighbouring samples is evaluated (although the samples need not necessarily be immediately neighbouring samples).

Figure 5A:
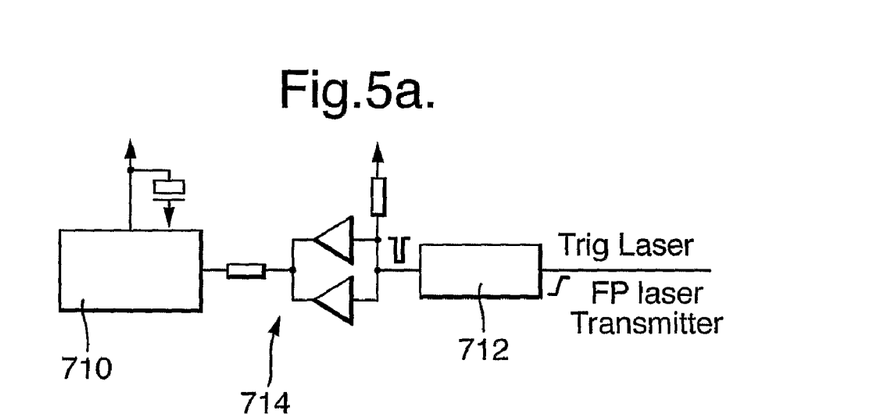
FIG. 5*a* shows an optical source circuit.
Figure 5B:
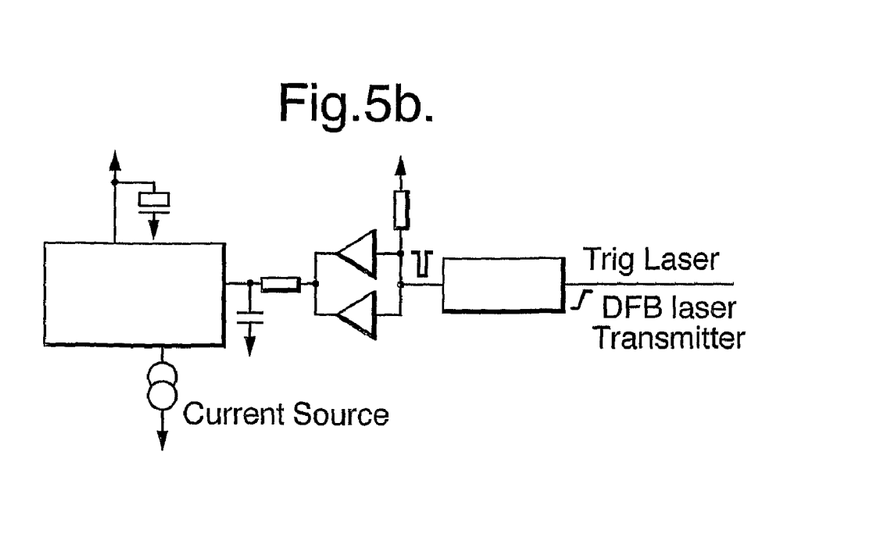
FIG. 5*b* shows another, less preferred optical source circuit.

The photo receiver 51 is shown in more detail in FIG. 4. Light from the coupler 28 is incident on a photo transistor 702, here a PIN-FET, which produces an electrical output that is fed to a bipolar transistor 704, acting as a buffer, before being fed to a variable gain current feedback amplifier 706. In FIG. 5a, a preferred optical source 18 is shown in more detail. Light for transmission onto the link 16 (through the interferometer stage) is generated by a Fabry Perot Laser 710. The trigger signal 561 from the timing control circuit 560 is received at a mono stable pulse generating unit 712, which generates a pulse for each trigger signal received, this pulse being amplified by a booster amplifier 714 so as to drive the laser 710. FIG. 5b shows an alternative in which a DFB laser is used. However, it has been found that a DFB laser can give rise to coherence noise, and instability.

It as thus be seen that in present embodiments, an optical time domain reflectometry technique is used in which a series of low coherence test pulses is launched into an the optical link, and the backscattered return signal is monitored. The test pulses pass through an unbalanced Mach Zhender interferometer with the result that for each test pulse, a pair of time-displaced pulse copies is launched onto the link. The backscattered signal is passed through the same interferometer, which causes the pulse copes of each pair to become realigned and to interfere with one another. A time-varying disturbance is likely to affect each pulse copy of a pair differently. As a result, an abnormality such as a step is likely occur in the backscattered signal. From the time position of an abnormality, the distance of the disturbance responsible along the fibre path is estimated. In particular, by providing self-crossing points, limitations due to the resolution length along the path of the fibre can be alleviated.

The invention claimed is:
1. A position sensor including:
an optical waveguide;
a transmission stage for launching a sensing signal into the waveguide;
a receiving stage arranged to receive a returned sensing signal, which returned sensing signal is a time distributed signal derived from backscattered components of the sensing signal, the waveguide being arranged along a path having a plurality of overlap regions such that a disturbance in an overlap region causes a first disturbance feature and a second disturbance feature in the returned sensing signal; and
monitoring means for monitoring the returned signal, such that a respective time of return can be associated with the first disturbance feature and with the second disturbance feature;
wherein the sensing signal comprise a series of pairs of pulses, each pair of pulses having been generated by power-splitting a single pulse, wherein each member of a respective pair of pulses is temporally off-set from the other member of said respective pair of pulses.

2. A position sensor as claimed in claim 1, wherein at least some of the overlap regions include a respective self-crossing point at which the waveguide path intersects itself.

3. A position sensor as claimed in claim 2, wherein the path includes a plurality of first sensing portions and a plurality of second sensing portions, and wherein, at a plurality of respective self-crossing points, each first sensing portion overlaps with each second sensing portion.

4. A position sensor as claimed in claim 3, wherein the first sensing portions generally extend side by side in a first direction.

5. A position sensor as claimed in claim 4, wherein the second sensing portions generally extend side by side in a second direction.

6. A position sensor as claimed in claim 2, wherein the self-crossing points are disposed as a regular array.

7. A position sensor as claimed in claim 1, wherein the sensing signals are pulses, each having a path resolution length associated therewith.

8. A position sensor as claimed in claim 7, wherein at least some neighbouring self-crossing points are connected together by both a short path and by a long path, the long path being at least substantially equal to the path resolution length.

9. A position sensor as claimed in claim 1, wherein the waveguide is a flexible waveguide.

10. A position sensor as claimed in claim 1, wherein the power split between each member of a pair of pulses is 50:50 so that said sensing signal is formed as pairs of signal copies.

11. A position sensor as claimed in claim 1, wherein the transmission stage is arranged to launch the pairs of pulses onto the waveguide so that each member of a respective pair of pulses has temporal offset relative to the member of said respective pair of pulses.

12. A position sensor as claimed in claim 11, wherein the receiving stage is arranged to temporally re-align the returned temporally offset members of each pair of pulses.

13. A position sensor as claimed in claim 1, wherein the transmission stage and the receiving stage are formed in common by an interferometer stage.

14. A position sensor as claimed in claim 1, wherein the monitoring means includes timer means for monitoring the return time of the first disturbance feature and the second disturbance feature.

15. A position sensor as claimed in claim 1, wherein the waveguide is a waveguide formed from a material that gives rise to Rayleigh backstattering of light at a wavelength of 1440 nm.

16. A position sensor as claimed in claim 15, wherein the waveguide has a light-guiding medium formed substantially from a glass material.

17. A method of sensing position, including the steps of:
(i) transmitting a sensing signal along a waveguide;
(ii) monitoring a returned sensing signal, the returned sensing signal being derived from components of the sensing signal that are returned by a process of distributed backscattering as the sensing signal propagates along the waveguide, wherein the waveguide is arranged along a path having a plurality of overlap regions such that a disturbance in an overlap region causes a first disturbance feature and a second disturbance feature in the returned sensing signal, which first and second disturbance features correspond to respective spaced apart positions along the fibre path; and
(iii) using a temporal characteristic in the first and second disturbance features to determine which of the overlap regions the disturbance originates from;
wherein said sensing signal comprises a series of pairs of pulses, each pair of pulses having been generated by power-splitting a single pulse, wherein each member of a respective pair of pulses is temporally off-set from the other member of said respective pair of pulses.

18. A method as claimed, in claim 17, wherein the process of distributed backscattering is predominantly Rayleigh backscattering.

19. A method as claimed in claim 17, wherein the sensing signals have a wavelength or wavelength range such that the waveguide operates as a single mode waveguide for the sensing signals.

20. A method as claimed in claim 17, wherein the temporal characteristic is a respective returned time corresponding to the first and the second disturbance feature.

21. A method as claimed in claim 17, wherein the power split between each member of a pair of pulses is 50:50 so that the sensing signal is formed by a pair of signal copies launched into the waveguide, which signal copies are copies of one another.

22. A method as claimed in claim 21, wherein the signal copies of a pair travel in a forward direction along the waveguide, and subsequently in a return direction along the waveguide.

23. A position sensor including:
an optical waveguide;
a transmission stage for launching a sensing signal into the waveguide;
a receiving stage arranged to receive a returned sensing signal, which returned sensing signal is a time distributed signal derived from backscattered components of the sensing signal, the waveguide being arranged along a path having a plurality of overlap regions such that a disturbance in an overlap region causes a first disturbance feature and a second disturbance feature in the returned sensing signal; and
monitoring means for monitoring the returned signal, such that a respective time of return can be associated with the first disturbance feature and with the second disturbance feature;
wherein the sensing signals are pulses, each having a path resolution length associated therewith; and
wherein the geographical separation between at least some of the self-crossing points is less than the path resolution length.

24. A position sensor as claimed in claim 23, wherein the short path between neighbouring self-crossing points is less than the path resolution length.

25. A position sensor including:
an optical waveguide;
a transmission stage for launching a sensing signal into the waveguide;
a receiving stage arranged to receive a returned sensing signal, which returned sensing signal is a time distributed signal derived from backscattered components of the sensing signal, the waveguide being arranged along a path having a plurality of overlap regions such that a disturbance in an overlap region causes a first disturbance feature and a second disturbance feature in the returned sensing signal; and
monitoring means for monitoring the returned signal, such that a respective time of return can be associated with the first disturbance feature and with the second disturbance feature;

wherein the sensing signals are pulses, each having a path resolution length associated therewith; and wherein an extension stage is provided between adjacent first sensing portions and/or between adjacent second sensing portions and wherein the path length of each extension stage is at least substantially greater than the path resolution length.

26. A position sensor as claimed in claim 25, wherein each extension stage is formed by a respective coiled portion of waveguide.

27. A position sensor as claimed in claim 25, wherein the extension stage is arranged such that it is protected from disturbances.

* * * * *